INVENTOR.
Waldemar T. Rentschler
BY
Arthur A. March
ATTORNEY

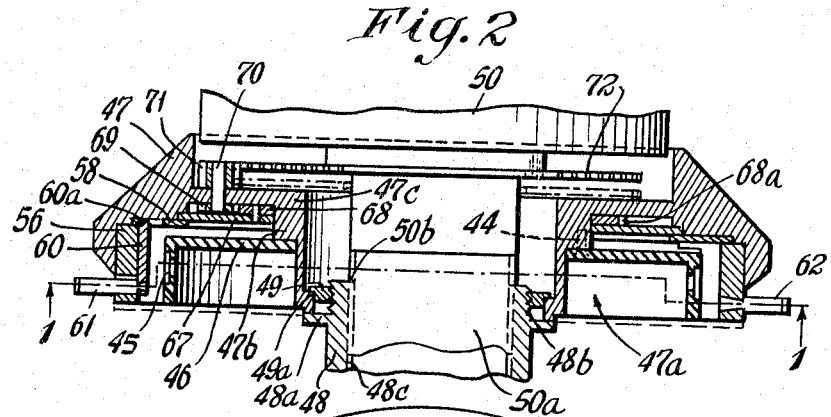
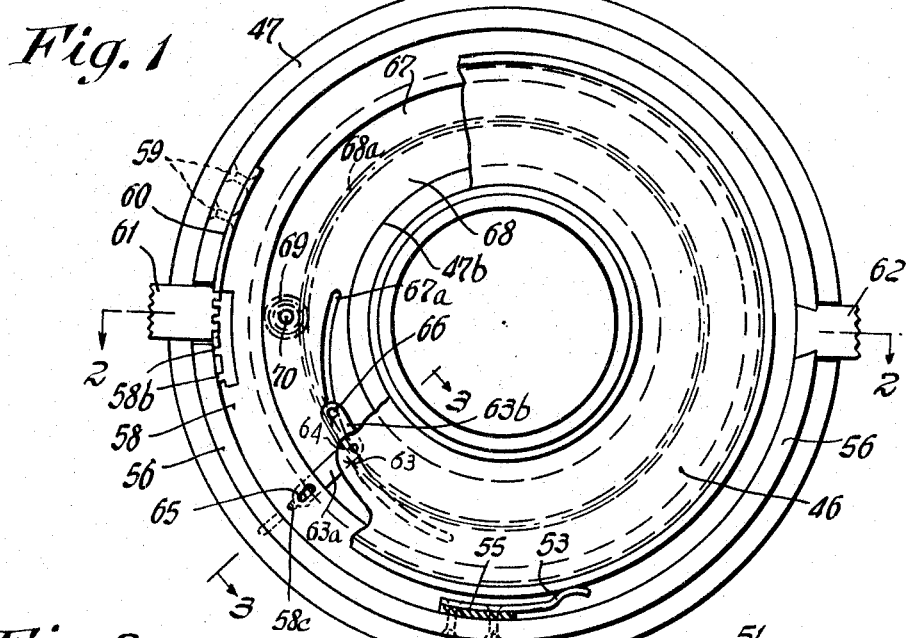
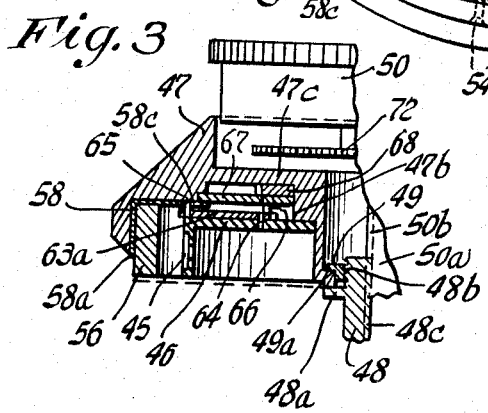
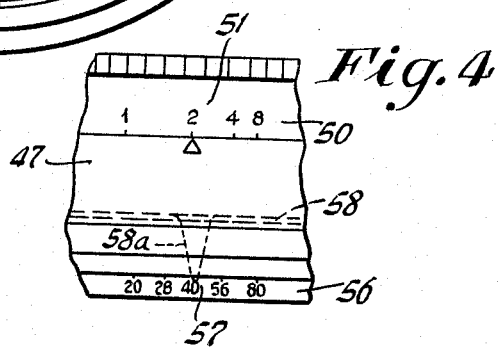

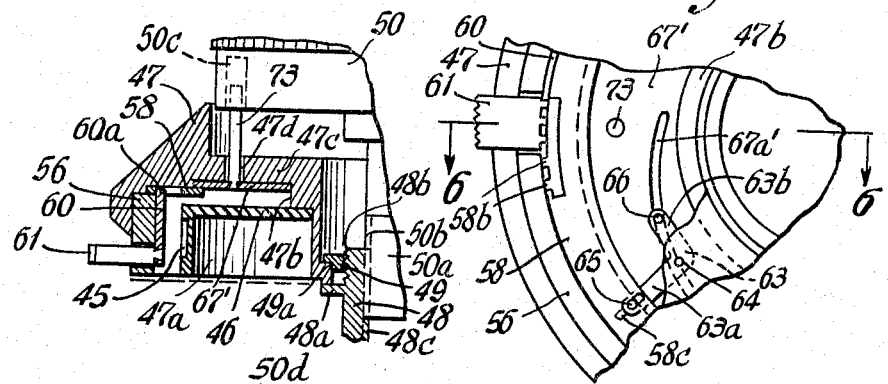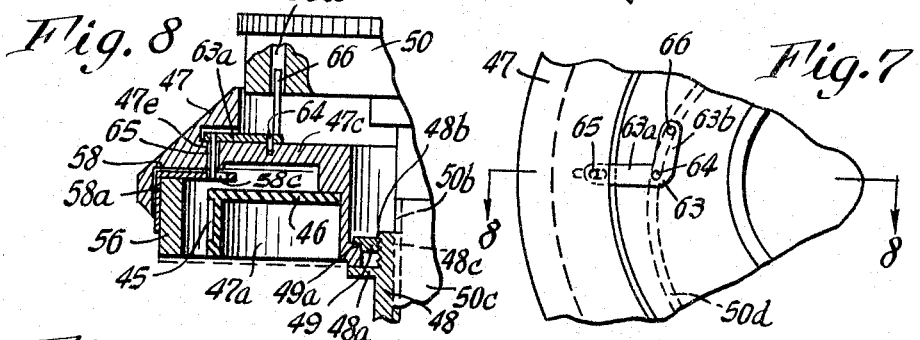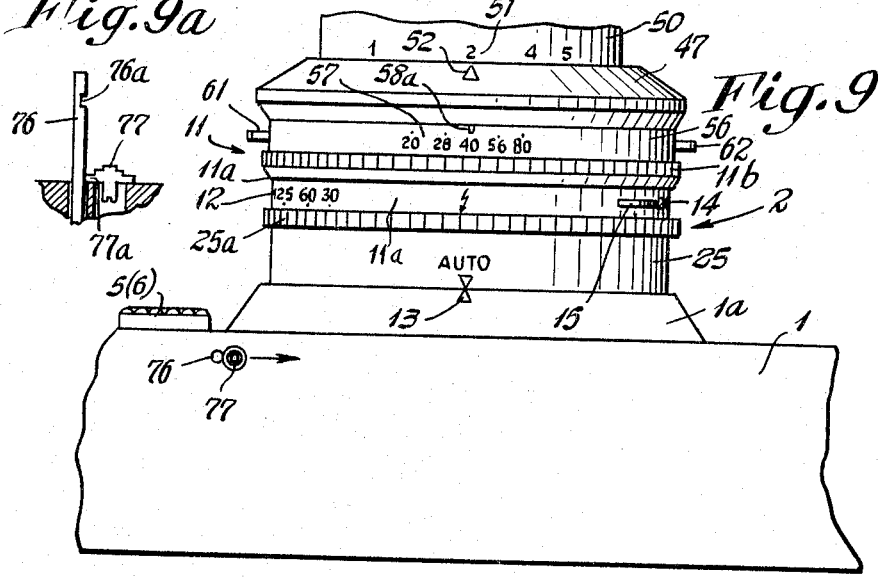

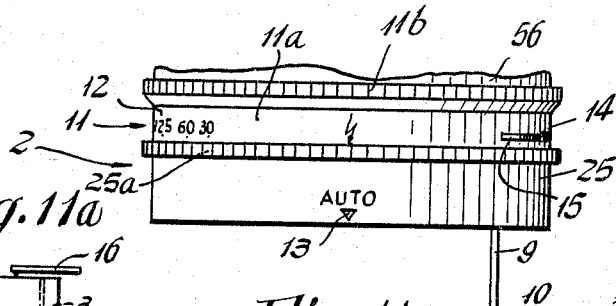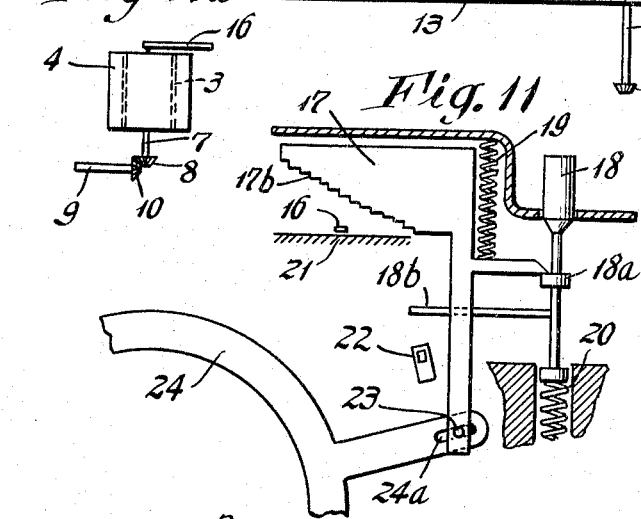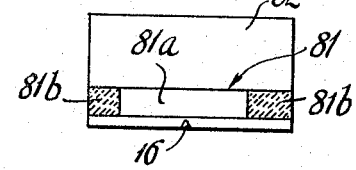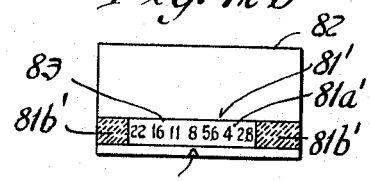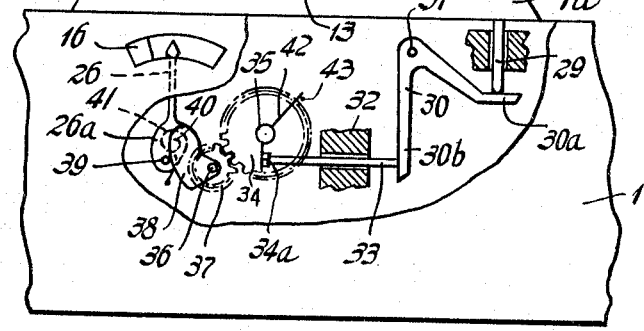

United States Patent Office 3,326,107
Patented June 20, 1967

3,326,107
PHOTOGRAPHIC CAMERA WITH COUPLED EXPOSURE METER
Waldemar T. Rentschler, Calmbach (Enz), Germany, assignor to Alfred Gauthier, G.m.b.H., Calmbach (Enz), Germany, a corporation of Germany
Filed June 9, 1964, Ser. No. 373,681
Claims priority, application Germany, June 10, 1963, G 37,916
13 Claims. (Cl. 95—64)

This invention relates to a photographic camera with a coupled exposure meter in which the meter is used for making daylight exposures as well as photoflash exposures, for which purpose the measuring mechanism of the exposure meter can be connected to a source of current independent of the photoelectric current.

In order to facilitate the setting of the diaphragm of a camera in accordance with the type of flashbulb used in making photoflash exposures and in accordance with the distance from the camera to the object being photographed, it has been known heretofore to connect the diaphragm aperture control to the focusing control by means of a releasable coupling. It has also been known to use an exposure meter built into the camera as a setting aid in making photoflash exposures. For this purpose, the measuring mechanism of the exposure meter can be connected to a battery and is rotatably mounted and so connected to the diaphragm control that a change in the diaphragm setting produces a change of the angular position of the measuring mechanism and hence of the indicating needle on the measuring mechanism. Two indicating scales have been associated with the needle: one a shutter speed scale for making daylight exposures and the other a distance scale for making photoflash exposures. Consequently, in response to the respective diaphragm setting, the exposure time could be read on the exposure meter for making daylight exposures and the distance indicated by the measuring mechanism needle could be read on the exposure meter for taking photoflash pictures, but such readings would then have to be transferred manually to the respective controls.

The problem to be solved by means of the present invention consists in simplifying and improving the mode of operation of a camera of the type just referred to, but with only a small structural expenditure and in such a way that the reading of the measuring mechanism needle and the manual transfer of this information to the proper control is eliminated. In addition, it is desirable that the same setting technique be used for photoflash exposures as is used for daylight exposures.

The present invention solves this problem by providing that the controls for exposure time, diaphragm aperture size, and possibly other exposure factors including film sensitivity, are so connected to the exposure meter that the diaphragm size, taken as a dependent variable, is determined by the respective position of the movable member of the measuring mechanism, and that, when the camera is adjusted for making a photoflash exposure, a variable resistor controlled by the focusing control and by the guide number setting device is connected into the circuit. This resistor is so regulated that, for the respective diaphragm aperture value resulting from the exposure parameter equation and based upon the preselected factors of photoflash bulb number and distance, the movable member of the measuring mechanism of the exposure meter will occupy the same position as for the corresponding diaphragm aperture value in the case of daylight exposures. As a consequence, the setting errors resulting from reading and manually transferring the values indicated by the exposure meter to the respective controls are completely eliminated, thus resulting in a greater uniformity of operation. Another advantage of the camera constructed according to this invention is that it is simple to operate because of the fact that the measurement made by the exposure meter is always decisive in determining the diaphragm aperture value for both daylight exposures and photoflash exposures. Moreover, it is important that the arrangement according to this invention is suitable for use with cameras having fully automatic diaphragm setting mechanisms as well as for cameras in which the diaphragm setting is determined by comparison of a resetting device with an indicator governed by the exposure meter.

In another embodiment of the invention the variable resistor is arranged on a stationary carrier disk, while the support for the movable contact associated with the resistor is a guide number scale ring which forms part of the guide number setting device and which is driven, for example by means of a gear mechanism, by the lens mount for the main lens which is rotatable with respect to the range setting and which can be set at different relative positions determined by the markings of the guide number scale with respect to the lens mount. In this arrangement only a single variable resistor is required for taking into account the factors of "guide number" and "range." When compared to another possible arrangement which provides for a separate variable resistor both for setting the focal distance of the lens and for setting the guide number, the arrangement of a single variable resistor requires that a specific diagram value can always be associated with a specific value of the resistor. Because of this fact, the arrangement constructed according to the present invention can be used in cameras with exposure meters having any characteristic whatsoever since the characteristic of the variable resistor can readily and unequivocally be adapted to that of the exposure meter.

In order to be able to use the arrangement of this invention in lens assemblies of any desirable characteristic, the invention also provides that the gear mechanism to drive the guide number scale ring may comprise means which transform the non-linear adjacent characteristic of the lens mount into a linear motion characteristic of the guide number scale ring carrying the movable contact of the resistor.

A particularly expedient structure, which is also quite simple, is achieved by providing a fixedly positioned lever in connection with the gear mechanism to act, on one side, in conjunction with a setting, or needle, ring that is coaxial with and releasably coupled to the guide number scale ring and that carries a needle, or marker, indicating the setting of the guide number scale. On the other side, the lever engages a control cam which influences the characteristic of motion of the needle ring and can be moved synchronously with the lens mount. Logically, the development of the control cam must be such that it imparts a linear motion characteristic to the needle ring and to the additional guide number scale ring releasably coupled thereto.

A development of the arrangement which insures flexibility and freedom of choice can also be obtained by providing the carrier of the control cam in the form of a ring, which is coaxial with and rotatably drivingly connected to the front lens mount.

In a further embodiment, the arrangement of the control cam may also be effected on the lens mount itself.

The rotatable drive of the cam carrier during the range setting can be obtained in a convenient way by connecting the cam carrier and the lens mount by means of a pin.

In order to connect the carrier and the lens mount, a gear coupling may be provided, including two pinions non-rotatably mounted on one shaft with one pinion meshing with a gear ring associated with the cam carrier and the other pinion meshing with another gear ring attached to the front lens mount.

It is a further advantage for the adjustment of the arrangement as well as for the assembly of the camera if the resistor carrier, the guide number scale ring, the needle ring or cam carrier, and the means designed to connect the cam carrier to the front lens mount are combined into one structural unit and arranged in the front plate of the shutter.

In order to avoid unnecessary losses of the source of current not derived from response to light, a manually operable standby switch may be arranged in the circuit of the source. This switch may be associated with a spring-biased actuating pin which is slidably mounted in the covering cap of the camera housing and which, when the switch is closed, projects some distance from the covering cap so as to be clearly visible; whereas when the switch is open, the pin is pushed into the cap against the spring-bias and is retained in this position by a manually-operated latch. Because of the fact that the actuating pin extends visibly from the covering cap of the camera case when the switch is closed, the photographer is reminded that, having terminated his photoflash exposures, he must depress this pin so as to open the battery circuit and reduce the drain thereon. In addition, the extended pin will automatically be depressed whenever the camera is put into the usual leather case.

Details of the invention will be described in the following specification, together with the drawing which illustrates several embodiments and in which:

FIG. 1 shows the rear view of the front plate of a photographic intra-lens shutter, the front plate being adapted for use as a carrier for a device for the automatic setting of the diaphragm in photoflash exposures.

FIG. 2 is a cross section through the shutter arrangement according to the sectional line 2—2 of FIG. 1.

FIG. 3 is a partial section through the same shutter arrangement taken along the line 3—3.

FIG. 4 shows the top view of the partial view sectionally illustrated in FIG. 3.

FIG. 5 is a partial view of another embodiment of the device designed for the automatic setting of the diaphragm in photoflash exposures.

FIG. 6 shows a section taken along the sectional line 6—6 of FIG. 5.

FIG. 7 shows another variant of the device for the automatic diaphragm setting in the flash range, comprising a front view of the front plate.

FIG. 8 shows a section through the arrangement according to FIG. 7 taken along the sectional line 8—8.

FIG. 9 is a diagrammatic top view of a photographic camera equipped with a device for the automatic diaphragm setting in the flash range.

FIG. 9a shows the operating pin of a device for actuating a contact switch.

FIG. 10 is a partially diagrammatic view of the intra-lens shutter shown in FIG. 9.

FIG. 11 is a diagrammatic view of the sensing device used for the diaphragm setting both in daylight and in photoflash exposures.

FIG. 11a shows the rotating coil measuring mechanism of the exposure meter, together with the gear members designed to change its basic position.

FIGS. 12a and 12b show a warning and indicating strip controlled by the exposure meter and visible in the viewfinder of the camera according to FIG. 9.

FIG. 13 is a partial top view of a photographic camera equipped with a resetting system, the covering cap being broken away above the resetting gear.

Figure 14:
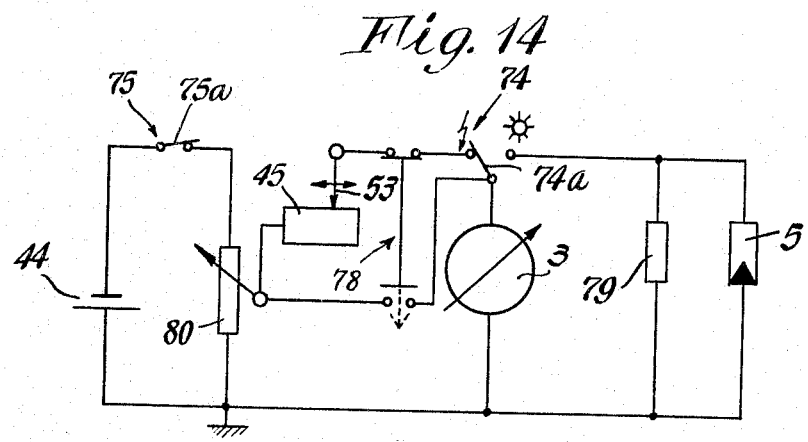
FIG. 14 is an electrical wiring diagram for the exposure meter built into the camera according to FIGS. 9 and 13 making use of a photocell as photo-electric receiver, as well as of a continuously variable electric resistor.

In describing the camera, reference will first be made to FIGS. 9 and 11a, in which there is shown a camera case 1 having a front plate 1a mounted thereon to which an intra-lens shutter 2 is attached. In the top portion of the camera case 1 is a photoelectric exposure meter which is connected to the diaphragm in the shutter 2 and which comprises a frame 3 having a coil 4 rotatably mounted thereon and supplied with current from a photo sensitive device which may be a photocell 5 or a photo-electric resistor 6. A shaft 7 is mounted on the frame 3 and extends coaxially with the coil 4. A bevelled gear 8 is attached to one end of the shaft 7 and meshes with a second bevelled gear 10 on the end of another shaft 9 at right angles to the first shaft.

The shaft 9 is driven by a shutter speed control 11 formed of two rings 11a and 11b movable with respect to each other. The ring 11a has a shutter speed scale 12 thereon so as to permit the control to be set with respect to a fixed mark 13 on the front plate 1a of the camera. In addition, a film sensitivity scale 14 is also imprinted on the ring 11a, to be set with respect to a mark (not shown on the drawing) arranged on the ring 11b. A releasable notched coupling is used in setting the relative positions of the rings 11a and 11b. The engaging portions of the coupling are within the shutter housing 2 and only the actuating knob or finger piece 15 extends outside.

In order to connect the shaft 9 to the control rings 11a and 11b, the ring 11a may be provided with teeth to mesh with a pinion on the shaft 9. As a result, the frame 3 and thus the rotating coil 4 of the exposure meter may be changed from one setting to another either by coupled setting of the control rings 11a and 11b in changing the shutter speed or upon differential setting of the control ring 11b with respect to the ring 11a in order to adjust for a different film sensitivity.

The setting of the exposure meter in response to the light of the scene to be photographed is accomplished by means of a device illustrated particularly in FIGS. 11 and 13. This device comprises, among other members, a sensing member 17 which engages a needle 16 on the exposure meter. The sensing member 17 slides up and down, governed by a shutter release trigger 18 which moves in the direction parallel to the direction of motion of the sensing member 17. The latter has an extension that engages a flange or collar 18a on the trigger 18 and is pressed upon by a compression spring 19 which causes the sensing member 17 to move downwardly and to maintain contact with the collar 18a as the shutter release trigger 18 is depressed to make a photograph. Opposed to the force of the spring 19 is another spring 20 of slightly greater power, which keeps the release trigger 18 and the sensing member 17 normally in the positions shown in FIG. 11. The lower surface of the sensing member 17 is in the form of a stepped cam 17b, the steps of which engage the needle 16 and depress it against a fixed surface in the form of an arcuate member 21 when the shutter release trigger 18 is depressed. Thus, the downward movement of the sensing member 17 is dependent upon the instantaneous location of the needle 16, the member 17 being permitted to move downward farther when the needle 16 is under the lefthand end of the stepped cam 17b than when it is under the righthand end as shown in FIG. 11. The shutter release trigger 18 has an arm 18b which extends out to make connection with a release lever 22 so located that it can be contacted by the arm 18b only after the shutter release 18 has been depressed beyond the lowermost point to which the sensing member 17 can move. Thus, the sensing member will have reached the position corresponding to the proper diaphragm setting before the lever 22 is actuated to operate the shutter.

The sensing member 17 is connected by a pin and slot connection comprising a pin 23 and a slot 24a to an adjusting member 24 which, in the present embodiment, is in the form of a ring and which is placed coaxially with the control rings 11a and 11b and is operatively connected in a known manner to the diaphragm lamellae. A driving connection may be incorporated, to be operative in the sensing direction and to be arranged between the adjusting member 24 and a separate actuating ring for the diaphragm lamellae.

The mechanism shown in FIGS. 9, 10 and 11 also includes provision for disconnecting the automatic diaphragm control so that the diaphragm can be adjusted manually, for example, to permit B-exposures to be made. Such exposures are set by means of a control ring 25 on the shutter 2, which ring is provided with a knurled collar 25a. The ring 25 has a diaphragm scale and an automatic setting position indicated by the word "auto," both the diaphragm scale and the auto position being set with respect to the fixed mark 13. If the ring 25 is placed, as shown in FIG. 9, with the word "auto" opposite the mark 13, the diaphragm will automatically be set by the sensing member 17 controlling the adjusting ring 24, the member 17 in turn being controlled by the exposure meter. The latter elements can be bypassed and the control 25 alone sets the diaphragm size for manual operation.

While the apparatus of FIGS. 9 through 11 provides for automatic setting of the diaphragm following the actuation of the shutter release trigger 18, the diaphragm in the embodiment of the camera illustrated in FIG. 13 is controlled with reference to a reset needle 26 which is coupled to the diaphragm and is made to line up with the needle 16 of the exposure meter. In FIG. 13 there is provided a diaphragm control 27 having two stub members 27a and 27b extending therefrom. This control is rotatably mounted on the shutter housing 2 and is provided with a diaphragm aperture scale 28 which cooperates with the fixed mark 13, just like the shutter speed scale 12 of FIGS. 9 through 11. The motion of the diaphragm control 27 is connected to the needle 26 by way of a pin 29 which slides longitudinally in the camera case 1 under pressure from a cam (not shown) associated with the control 27. The displacement of the pin 29 is transmitted by a bell crank lever 30 pivotally mounted on an axle 31 within the camera case 1. The lever has one arm 30a that engages the pin 29 and a second arm 30b that bears against another pin 33 longitudinally slidably mounted in a bushing, or sleeve, 32. The pin 33 is connected to a lug 34a of a gear 34 mounted on a pivot pin 35 and meshed with a gear 37 mounted on a pivot pin 36. A control cam 38 coaxial with the gear 37 is drivingly connected thereto to bear against a pin 39 on the lever arm 26a of the reset needle 26. This needle is pivotally mounted on a pin 40 and is spring-biased by a spring 41 that urges it to rotate counterclockwise so as to press the pin 39 against the cam 38. A spring 42, one end of which engages the lug 34a while the other end of which engages a fixed pin 43, presses the pin 33 against the lever 30 and the latter against the pin 29 to eliminate any backlash in the operation of this mechanism.

If the foregoing embodiments for automatic or semiautomatic operation of the diaphragm are supplemented by the apparatus described hereinafter, the resultant camera will be able selectively to carry out either daylight exposures, where the preset shutter speed and film sensitivity are taken into consideration, or flashlight exposure after the camera has been set to take into account the guide number of the flashbulb and the distance from the camera to the object to be photographed.

Figure 15:
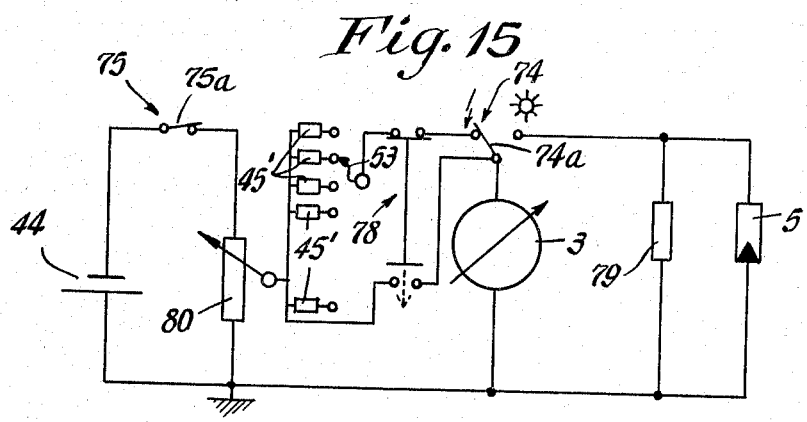
FIG. 15 shows the electrical wiring diagram for the exposure meter when using a stepped resistor.
Figure 16:
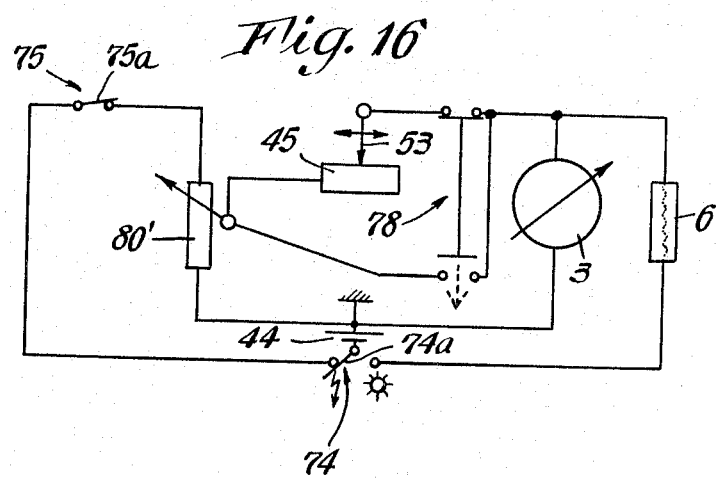
FIG. 16 shows the electrical wiring diagram for the exposure meter, a photo-electric resistor being used as photo-electric receiver.

FIGS. 14 through 16 show circuits for energizing the exposure meter, one circuit receiving current from the photo-cell 5 and the other from the battery 44. A photoelectric resistor 6 can be connected ahead of the battery 44. The flow of battery current is controlled by suitable resistors which may be made variable in response to the setting of a control according to the flashbulb number and a control set by the focusing mechanism of the camera. These resistors influence the position of the needle 16 so that the diaphragm value, which is subsequently set, corresponds to the other exposure parameters.

For the purpose of adjustment, it is possible to use either a continuously variable resistor 45, as shown in FIGS. 14 and 16, or a stepped resistor 45' as shown in FIG. 15. In either case, the resistors 45 and 45' may be supported, as shown in FIGS. 2, 3, 6 and 8, on a plate 46 made of insulating material and located behind the front plate 47 of the shutter 2. The front plate 47 serves in a usual manner to cover the front of the shutter housing and is supported thereon by a collar or flange 48a that extends from a tubular socket 48. In addition, a retaining ring 49, which can be screwed on to the external thread 48b of the socket 48, keeps the front plate 47 from falling off. The ring 49 has a centering lug 49a for the front plate 47. The rear side of the front plate 47, facing the shutter housing, has a turned groove 47a and the plate 46 is housed therein so as to engage the face of a bearing attachment 47b to be affixed thereto by means of screws 44.

The main lens of the camera has a conventional front lens mount 50 which may be displaced rotationally and in the direction of the optical axis so as to focus the lens assembly. For this purpose, a cylindrical extension 50a is provided with an external thread 50b which engages a corresponding thread 48c on the socket 48. The front lens mount 50 is set, in accordance with standard practice, by means of a distance scale 51 located on the mount and cooperating with a fixed mark 52 on the front plate 47.

Referring to FIGS. 1, 3 and 9 it will be seen that the front lens mount 50 has a sliding contact device 53 drivingly connected thereto and making contact with the resistor 45. The sliding contact 53 is attached to a ring 56 by two rivets 54 and is insulated by means of a layer 55. The ring 56 has a flashbulb guide member scale 57 which is set with reference to a mark 58a on a needle, or pointer, ring 58 concentric with the ring 56, and the rings 56 and 58 can be coupled to each other in different setting positions determined by the guide number scale 57. This coupling is effected by means of an interlocking resiliently bias member 60 which is connected to an inner circumference of the ring 56 by means of two rivets 59. The free end of the member 60 has a tooth 60a that engages the notched recess 58b of the ring 58. This notched coupling may be released by means of a radially movable push button 61 attached to the member 60. A corresponding button 62 attached to the ring 56 at a diametrically opposite point is used as a finger support during the uncoupling and setting process for changing the relative positions of the rings 56 and 58.

The setting motion of the front lens mount 50 is transmitted to the ring 56 by a bell crank lever 63 as shown particularly in FIGS. 1, 5 and 7. This lever is pivotally mounted on a pin 64 and, as shown in the embodiment in FIGS. 1 through 4, 5 and 6, the fixed resistor support plate 46 serves as the carrier for the pin 64. In the embodiment illustrated in FIGS. 7 and 8, the pin 64 is arranged on the wall 47c of the front plate 47. The lever 63 has an arm 63a with a pin 65 that engages a slot 58c in the ring 58 and a second arm 63b that has a pin 66 which moves within a cam slot that operates synchronously with the front lens mount 50.

In the embodiment shown in FIGS. 1 through 4 a cam 67a is formed in a ring 67 rotatably mounted on the bearing lug 47b and secured against axial displacement by the ring 58. Another ring 68 is firmly attached to the ring 67 and is provided with external teeth 68a to engage a pinion 69 nonrotatably mounted on a shaft 70. This shaft is guided in the wall 47c of the front plate 47 and has, at its free end, another pinion 71 which engages a gear ring 72 nonrotatably connected to the front lens mount 50. Since the ring 72 moves axially with the lens mount 50, the axial length of the pinion 71 must be at least equal to the maximum axial motion of the lens mount.

FIG. 2 shows the two extreme positions of the lens mount, the position of the gear 72 in solid lines corresponding to the smallest value on the distance scale 51, while the position shown in broken lines corresponding to the setting of the lens mount at "infinity."

The shape of the cam 67a is such that the rotary motion of the front lens mount 50 is transmitted, in a certain proportion, to the guide member scale ring 56 and thereby to the contact 53. In addition, the unequal motion of the front lens mount 50 is transformed into a uniform motion of the rings 56 and 58, which is adapted to the setting characteristic of the diaphragm.

The embodiment shown in FIGS. 5 and 6 differs from that shown in FIGS 1 through 4 only by the fact that the lens mount 50 and the cam carrier 67' are connected by a pin 73 parallel to the shutter axis and are not connected by means of a gear drive. The pin 73 is rigidly attached as by riveting to the cam carrier 67' and engages a bore 50c of the lens mount 50. The wall 47c of the front plate 47 has a slot-like opening 47d extending over an angular range corresponding to the setting range of the lens mount 50. The pin 73 extends through this opening.

FIGS. 7 and 8 illustrate a particularly simple arrangement of the device to transmit the setting motion of the lens mount 50 to the rings 56 and 58. The cam 50d influencing the bell crank lever 63 is formed directly in the lens mount 50 and not on a separate ring. In this case, the bell crank lever 63 may be located on the side of the wall 47c opposite the lens mount 50. An opening 47e is formed in the wall 47c to receive the pin 65 of the bell crank lever which engages the slot 58c.

As is apparent from the circuit diagram in FIG. 15 the regulating member for taking into account the type of flashbulb being used and the distance from the camera to the object being photographed is arranged in the circuit of the battery 44 and formed as a gradually variable resistor. This regulating member consists of a plurality of resistors and a switch for making connection with certain or the resistors selectively, the resistors corresponding to the number of the marked setting positions of the lens mount 50. In addition, according to FIGS. 14 through 16, a switch 74 may be provided to connect the coil 3 of the exposure meter either directly to the battery 44 or to the photo sensitive element, either the photocell 5 or the photo sensitive resistor 6. Thus the switch 74 has a contact arm 74a with two positions, one marked by a flash symbol and the other by a sun symbol. The arm 74a is coupled to the shutter speed control 11 so that, when it is set at the range identified by the scale 12, it occupies the position marked by the sun symbol and otherwise it occupies the position corresponding to the flash symbol. Moreover, the apparatus may be arranged so that the exposure time suitable for photoflash exposures, for example 1/30 second is set whenever the shutter speed control 11 is placed in the flash setting position.

In addition to the switch 74, the circuits of FIGS. 14 through 16 include an additional switch 75 which must be actuated to energize the coil 3 for flash exposures. In order to avoid an undue drain on the battery 44, the switch 75 should be opened whenever the ever-ready carrying case of the camera is closed. For this purpose, an actuating pin 76 may be provided as shown in FIG. 9a. This pin extends from the housing 1 and is connected to the arm 75a of the switch 75. When this pin is depressed, the switch 75 is opened and may be held opened by locking the pin 76 by means of a sliding catch 77 having a lug 77a that engages a slot 76a in the pin 76. The pin 76 may be made to extend to whatever distance may be required to be sure that it is operated by the closing of the every-ready case.

The circuit diagrams of FIGS. 14 through 16 are provided with an additional testing switch 78 which permits the photographer to determine the condition of the battery 44 prior to attempting a photoflash exposure. When the switch 78 is not actuated, it occupies the position shown in FIGS. 14 through 16 thereby electrically connecting the resistor 45 or the group of resistors 45' to the coil 3 of the exposure meter. However, if the switch 78 is depressed, this connection is broken and instead a direct connection is established between the battery 44 and the coil 3 which will deflect the coil 3 fully if the battery is in good condition. Upon release, the switch 78 returns automatically to the position shown in the diagram.

For adjusting the electric circuit, it is possible to use calibration resistors. In the embodiments shown in FIGS. 14 and 15 standard resistors 79 and 80 are connected, respectively, in the circuit of the photocell 5 and in the circuit of the battery 44. The embodiment of FIG. 16 uses a photo-sensitive resistor so that only the single standard resistor 80' need be used.

In order for the photographer to find out before taking a picture whether the diaphragm is set at the proper value for the exposure factors, either to make daylight exposure or a photoflash exposure, a warning device may be provided. Such a device is shown in FIGS. 12a and 12b. The device in FIG. 12a may consist of a strip 81 having, for example a green central area 81a and two additional fields 81b, which may be red in color, adjoining the central field on either side. The strip 81 is reflected into the view finder 82 of the camera, just like the needle 16 of the measuring mechanism. If the needle is located in the green field 81a, the photographer can conclude that the automatically set diaphragm value is within the proper diaphragm range of the camera but if the needle 16 is located in either of the side fields 81b, it will be an indication that the automatically set diaphragm value is not within the permissible range.

In the arrangement according to FIG. 12b the indicating device consists of a strip 81' having a green central area 81a' and two red areas 81b' within whose range the needle 16 moves. In addition a diaphragm value scale 83 is engaged on the central area 81a' to inform the photographer as to the size of the diaphragm aperture set during the sensing process.

The foregoing camera operates in the following manner:

If a daylight exposure with automatic diaphragm setting is to be carried out, the exposure time setting must first be effected by means of the control 11. During this process, the switch 74 is transferred to the contact position, identified by the sun symbol, in which the coil 3 of the exposure meter is connected to the photocell 5 or to the photo-sensitive resistor 6 to be energized by the photoelectric current produced in response to the light of the scene to be photographed. If the camera is of the type illustrated in FIG. 9 it is also necessary to move the setting control 25 to the "auto" setting position. The diaphragm will then be set automatically by merely depressing the shutter release trigger 18. This permit the sensing member 17 to move down under the force of the spring 19 until the sensing member is stopped by the measuring mechanism needle 16. This movement of the sensing member 17 operates the diaphragm setting member 24 by rotating it clockwise to set the diaphragm lamellae at a certain aperture in response to the rotary motion of the diaphragm setting member. Thereafter, the continued downward movement of the shutter release trigger 18 actuates the release member 22 to operate the camera shutter.

In the camera shown in FIG. 13 the diaphragm is set by rotation of the setting member 27 until the reset needle 26 is brought opposite the measuring mechanism needle 16. The diaphragm aperture that has just set can be read on the scale 28.

The film sensitivity setting can be carried out after the coupling connection between the rings 11a and 11b has been disengaged. These rings are set with respect to each other by depressing the member 15 so that the ring 11b can be moved as necessary to bring the film sensitivity value on the ring 11a opposite the setting mark on the ring 11b. Thereafter, the two rings are latched together so that they move as a unit with the result that rotation of the coupled rings 11a and 11b, in order to rotate the carrier 4 of the coil 3 by way of the gear members 7 to 9 means that the resultant position of the coil is due to the film sensitivity as well as to the shutter speed.

If this apparatus is to be used for photoflash exposures it will be necessary to actuate the switch 75, 76 connected in the circuit of the battery 44 to shift the switch to the closed position illustrated in FIGS. 14 through 16. In order to do this, the photographer merely has to remove the latch 77 from engagement with the slot 76a in the pin 76. Moreover, the shutter speed control 11 must be rotated so that the flash symbol thereon will be opposite the fixed mark 13. As a result the exposure time suitable for photoflash exposures is set on the shutter and the switch 74 is transferred to the position in which it connects the battery 44 to the coil 3.

In addition the distance has to be set by rotating the lens mount 50 to bring the distance scale 51 into proper position with respect to the fixed mark 52. The guide number scale ring 56 must be disconnected from the needle ring 58 and rotated so as to place the needle 58a opposite the guide number of the photoflash bulb being used. During this setting process, i.e. during the setting of the focus control and the guide number setting member, the movable resistor contact 53 is shifted along the resistor 45 or 45'. This produces a resistance change and a corresponding influencing of the setting position of the needle 16. During the subsequent sensing process, the diaphragm will be set automatically at a value that takes into consideration the preset factors "guide number" and "distance" as those factors are controlled by the predetermined settings of the ring 56 and the lens mount 50. Thus in the flash range, the setting of the diaphragm takes place in exactly the same manner as in daylight exposures, i.e. by depressing the shutter release trigger 18 or by moving the reset needle 26 into coincidence with the measuring mechanism needle 16.

What is claimed is:

1. A photographic camera comprising: a coupled exposure meter, said exposure meter comprising a measuring mechanism, a source of photoelectric current, and a second source of current; a shutter speed control; a variable diaphragm actuating member; means connecting said measuring mechanism to said diaphragm actuating member to determine the diaphragm value, said shutter speed control having a "flash" position; a variable resistor means, said resistor means being switched on when the camera is adjusted by said shutter speed control for flash exposure; a support for said resistor means; a movable contact engaging said resistor means; a flashbulb guide number setting device; a guide number scale ring forming part of said guide number setting device; a rotatable lens mount focus control; a mechanical linkage connecting said focus control to said guide number scale ring; releasable coupling means to connect said scale ring differentially with respect to said focus control; a connection between said resistor means and said second source of current; and a connection between said movable contact and said measuring mechanism whereby the operation of said measuring mechanism can be controlled by the setting of said movable contact which, in turn, can be controlled by said focus control and said guide number scale ring when said shutter speed control is set to its flash position and said measuring mechanism is energized by said source of photoelectric current when said shutter speed control is set for daylight exposures.

2. A photographic camera comprising: a coupled exposure meter, said exposure meter comprising a measuring mechanism, a source of photoelectric current, and a second source of current; a shutter speed control; a variable diaphragm actuating member; means connecting said measuring mechanism to said diaphragm actuating member to determine the diaphragm value, said shutter speed control having a "flash" position; a variable resistor means, said resistor means being switched on when the camera is adjusted by said shutter speed control for flash exposure; a support for said resistor means; a movable contact engaging said resistor means; a flashbulb guide number setting device; a guide number scale ring forming part of said guide number setting device; a rotatable lens mount focus control having a non-linear focusing adjustment; a gear mechanism connecting said focus control to said guide number scale ring to rotate said guide number scale ring linearly; releasable coupling means to connect said ring differentially with respect to said focus control; a connection between said resistor means and said source of current; and a connection between said movable contact and said measuring mechanism whereby the operation of said measuring mechanism can be controlled by the setting of said movable contact which, in turn, can be controlled by said focus control and said guide number scale ring when said shutter speed control is set to its flash position and said measuring mechanism is energized by said source of photoelectric current when said shutter speed control is set for daylight exposures.

3. A photographic camera comprising: a coupled exposure meter, said exposure meter comprising a measuring mechanism, a source of photoelectric current, and a second source of current; a shutter speed control; a variable diaphragm actuating member; means connecting said measuring mechanism to said diaphragm actuating member to determine the diaphragm value, said shutter speed control having a "flash" position; a variable resistor means, said resistor means being switched on when the camera is adjusted by said shutter speed control for flash exposure; a support for said resistor means; a movable contact engaging said resistor means; a flashbulb guide number setting device; a guide number scale ring forming part of said guide number setting device; a rotatable lens mount focus control; a gear mechanism comprising gears and a two-armed lever connecting said focus control to said guide number scale ring; a needle ring connected to said focus control; releasable coupling means to connect said scale ring differentially with respect to said needle ring; a control cam connected to said focus control to move synchronously therewith; a connection between said resistor means and said second source of current; and a connection between said movable contact and said measuring mechanism whereby the operation of said measuring mechanism can be controlled by the setting of said movable contact which, in turn, can be controlled by said focus control and said guide number scale ring when said shutter speed control is set to its flash position and said measuring mechanism is energized by said source of photoelectric current when said shutter speed control is set for daylight exposures.

4. The photographic camera of claim 3 in which said control cam is formed on said lens mount.

5. The photographic camera of claim 3 comprising, in addition, a carrier supporting said cam, said carrier being in the form of a ring coaxial with said lens mount and rotatably drivingly connected thereto.

6. The photographic camera of claim 5 comprising, in addition, a pin connecting said carrier to said lens mount.

7. A photographic camera comprising: a coupled exposure meter, said exposure meter comprising a measuring mechanism, a source of photoelectric current, and a second source of current; a shutter speed control having a "flash" position; a variable diaphragm actuating member connected to said measuring mechanism; a manual diaphragm aperture control to control said actuating member, said diaphragm aperture control having an automatic position; a resistor means, said resistor means being switched on when the camera is adjusted by said shutter speed control for flash exposure; a movable contact connected to said resistor means at different resistor levels; a flashbulb guide number setting device comprising a guide number scale ring; a rotatable lens mount focus control; a gear mechanism connecting said focus control to said guide number scale ring; a needle ring connected to said focus control; a releasable coupling connecting said scale ring differentially with respect to said needle ring; a control cam connected to said focus control to move synchronously therewith; a carrier for said cam; a gear connecting said carrier to said lens mount and comprising a first gear associated with said carrier, a second gear attached to said lens mount, a first pinion engaging said first gear, a second pinion engaging said second gear, and a common shaft rigidly attached to both of said pinions; a connection between said resistor means and said second source of current; and a connection between said movable contact and said measuring mechanism whereby the operation of said measuring mechanism can be controlled by the setting of said movable contact which, in turn, can be controlled by said focus control and said scale ring when said shutter speed control is set to its "flash" position and said measuring mechanism is energized by said source of photoelectric current when said shutter speed control is set for daylight exposures.

8. A photographic camera comprising: an intra-lens shutter; a front plate for said shutter; a coupled exposure meter, said exposure meter comprising a measuring mechanism, a source of photoelectric current, and a second source of current; a shutter speed control; a variable diaphragm actuating member; means connecting said measuring mechanism to said diaphragm actuating member to determine the diaphragm value, said shutter speed control having a "flash" position; a variable resistor means, said resistor means being switched on when the camera is adjusted by said shutter speed control for flash exposure; a support for said resistor means mounted on said front plate; a movable contact engaging said resistor means; a flashbulb guide number setting device; a guide number scale ring forming part of said guide number setting device and mounted on said front plate; a rotatable lens mount focus control; a gear mechanism connecting said focus control to said guide number and mounted on said front plate; a needle ring connected to said focus control; releasable coupling means to connect said scale ring differentially with respect to said needle ring; a control cam connected to said focus control to move synchronously therewith and mounted on said front plate; a connection between said resistor means and said second source of current; and a connection between said movable contact and said measuring mechanism whereby the operation of said measuring mechanism can be controlled by the setting of said movable contact which, in turn, can be controlled by said focus control and said guide number scale ring when said shutter speed control is set to its flash position and said measuring mechanism is energized by said source of photoelectric current when said shutter speed control is set for daylight exposures.

9. A photographic camera comprising: a coupled exposure meter, said exposure meter comprising measuring mechanism, a source of photoelectric current, a second source of current and a manually-operated standby switch to connect said second source to said measuring mechanism; a shutter speed control; a diaphragm actuating member; means connecting said measuring mechanism to said diaphragm actuating member to determine the diaphragm value setting thereof, said shutter speed control having a "flash" position; a variable resistor means, said resistor means being switched on when the camera is adjusted by said shutter speed control for flash exposure; a focus control; a flashbulb guide number setting device, said resistor means having a value such that, for the respective diaphragm value resulting from predetermined settings of said focus control and said guide number setting device, said actuating member occupies the same position as for the corresponding diaphragm value when said shutter speed control is set for daylight exposures.

10. The photographic camera of claim 9 comprising, in addition: an actuating pin for said switch, extending from said camera when said switch is closed and retracted into said camera when said switch is opened, said pin having a notch therein, and a latch engaging said notch when said pin is retracted.

11. The photographic camera of claim 9 comprising, in addition: a view-finder and an indicating device connected to said exposure meter and visible in said view-finder to indicate whether a photograph can be taken with the parameters set.

12. The photographic camera of claim 11 in which said measuring mechanism comprises an indicating needle and said indicating device comprises areas of different colors, and said needle is superposed on one of said areas in said view-finder.

13. The photographic camera of claim 12 in which one of said areas is centrally located and has a diaphragm value scale.

References Cited

UNITED STATES PATENTS

| 2,943,545 | 7/1960 | Fahlenberg | 95—64 X |
| 3,118,356 | 1/1964 | Sauer | 95—64 |
| 3,165,989 | 1/1965 | Kiper | 95—10 |
| 3,175,479 | 3/1965 | Beach | 95—64 |

JOHN M. HORAN, *Primary Examiner.*

NORTON ANSHER, *Examiner.*

CLIFFORD B. PRICE, *Assistant Examiner.*